A. BORUP.
BELT CLAMP.
APPLICATION FILED APR. 7, 1910.
974,637.
Patented Nov. 1, 1910.
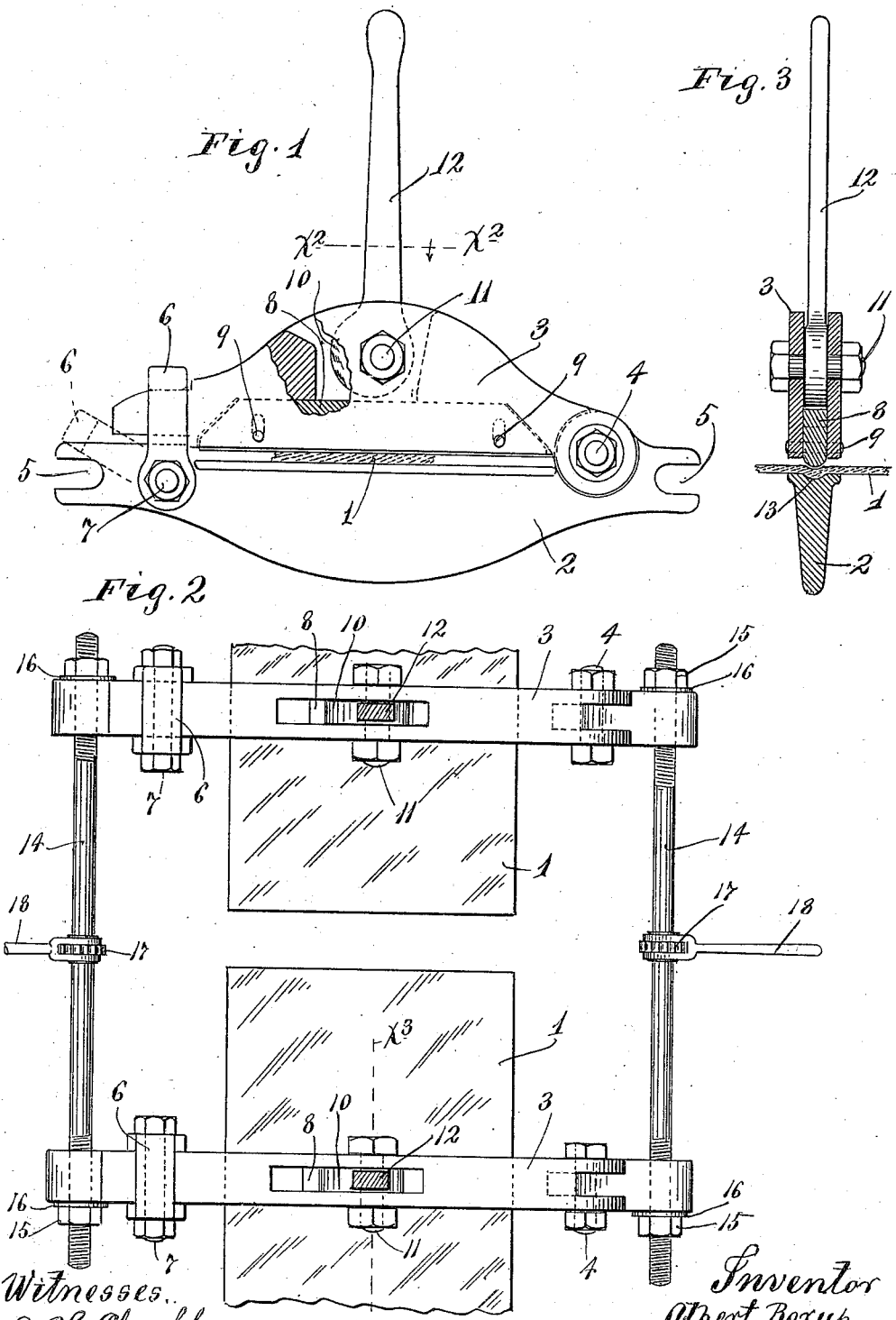

UNITED STATES PATENT OFFICE.

ALBERT BORUP, OF MINNEAPOLIS, MINNESOTA.

BELT-CLAMP.

974,637.  Specification of Letters Patent.  Patented Nov. 1, 1910.

Application filed April 7, 1910. Serial No. 554,001.

*To all whom it may concern:*

Be it known that I, ALBERT BORUP, a citizen of the United States, residing at Minneapolis, in the county of Hennepin and State of Minnesota, have invented certain new and useful Improvements in Belt-Clamps; and I do hereby declare the following to be a full, clear, and exact description of the invention, such as will enable others skilled in the art to which it appertains to make and use the same.

My invention has for its object to provide an improved belt clamp adapted for use to hold the ends of a belt with the belt drawn tight and stretched while the ends of the belt are being laced together.

To the above end, the invention consists of the novel devices and combinations of devices hereinafter described and defined in the claim.

In the accompanying drawings, which illustrate the invention, like characters indicate like parts throughout the several views.

Referring to the drawings: Figure 1 is a side elevation, showing the improved belt clamp, some parts being broken away; Fig. 2 is a plan view of the improved belt clamp, with some parts sectioned on the line $x^2$ $x^2$ of Fig. 1; and Fig. 3 is a section taken on the line $x^3$ $x^3$ of Fig. 2.

The numeral 1 indicates the end portions of the belt, the ends of which are being held by the improved clamp.

The improved clamp comprises a pair of coöperating clamping heads and a pair of bolts or threaded rods for drawing the same together. Each clamping head is made up of a pair of clamping levers 2 and 3, which at one end are pivotally connected at 4, as shown, by a short nutted bolt. The ends of the lever 2 project beyond the ends of the lever 3 and are provided with notches or open bolt seats 5. The free end of the lever 3, as shown, is shouldered, and beveled and adapted to be embraced and engaged by a U-shaped locked yoke 6 that is pivotally connected to the lever 2 at 7, as shown, by means of a short nutted bolt. When the yoke 6 is turned into the position indicated by dotted lines in Fig. 1, the lever 3 may be freely moved into an open position so that the head may be easily applied to or removed from the end of the belt. When, however, the yoke 6 is turned into its operative position, as indicated by full lines in Fig. 1, it will hold the two levers 2 and 3 locked together and against pivotal movement, the one in respect to the other.

The lever 3 in its inner edge is formed with a groove in which a clamping blade 8 is mounted for edgewise movement into and out of the said lever, its said movement being limited, as shown by slot and pin connections 9. The central portion of the clamping blade 8 is subject to the action of a cam or eccentric head 10 which works into a recess in the lever 3, and is pivotally connected thereto at 11, as shown, by a nutted bolt and is provided with a projecting operating lever 12. Preferably the projecting edge of the clamping blade 8 is rounded and the opposing edge of the coöperating lever 2 is formed with a groove 13 into which the belt is adapted to be pressed by said blade, as shown in Fig. 3 and thereby very securely held.

When the two clamping heads are applied to the ends of the belt, as shown in Fig. 2, tightening bolts or rods 14 having reversely threaded ends and coöperating nuts and washers 15 and 16 are applied by lateral movements, in the notched ends 5 of the two levers 2, then by rotation of the said bolts 14, the two clamping heads may be drawn together and the belt put under the desired tension, with the ends of the belt clamped and held so that when properly cut, they may be properly laced together.

To provide for ready rotation of the draw bolts 12, they are preferably provided at their central portions with rigidly secured ratchet wheels 17 and coöperating pivotally mounted pawl equipped levers 18.

This improved belt clamp, so-called, has in practice been found highly efficient for the purposes had in view. It is especially adapted for use on very large belts which require very considerable power to stretch or draw the same properly for the lacing of the ends thereof.

What I claim is:

The combination with two pairs of pivotally connected levers, one member of each pair being longer than the other and having laterally open bolt seats, locked yokes pivotally connected to the relatively long lever and detachably engageable with the ends of the relatively short lever, a belt clamping blade mounted in one member of each pair of levers, cam devices pivoted to the same levers and operative on the central portions of the respective clamping blades, and nut equipped bolts detachably engageable with the open seats of said long levers, for drawing the two pairs of clamping levers together in order thereby to stretch or tighten the belt.

In testimony whereof I affix my signature in presence of two witnesses.

ALBERT BORUP.

Witnesses:
ALICE V. SWANSON,
HARRY D. KILGORE.